H. TILDEN.

Improvement in Cultivators

No. 130,337.                    Patented Aug. 6, 1872.

Witnesses.
C. F. Brown
D. F. Ellsworth

Inventor.
H. Tilden,
By his Attys.
Hill & Ellsworth

UNITED STATES PATENT OFFICE

HENRY TILDEN, OF DAVENPORT, IOWA.

IMPROVEMENT IN CULTIVATORS.

Specification forming part of Letters Patent No. 130,337, dated August 6, 1872.

*To all whom it may concern:*

Be it known that I, HENRY TILDEN, of Davenport, in the county of Scott and State of Iowa, have invented a new and useful Improvement in Harrow Attachment for Cultivators; and I do hereby declare the following to be a full and exact description of the same, reference being had to the accompanying drawing forming part of this specification, in which—

Figure 1:
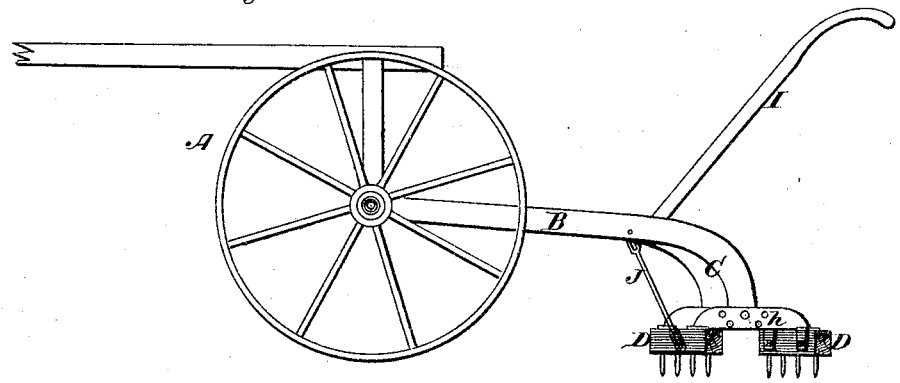
Figure 2:
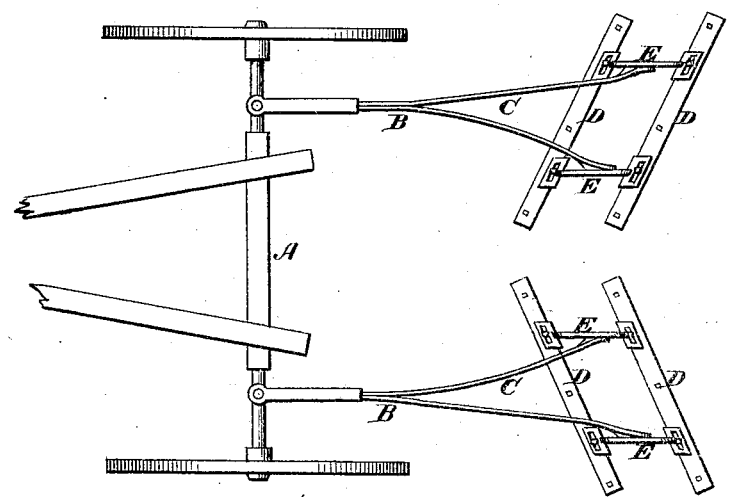
Figure 3:
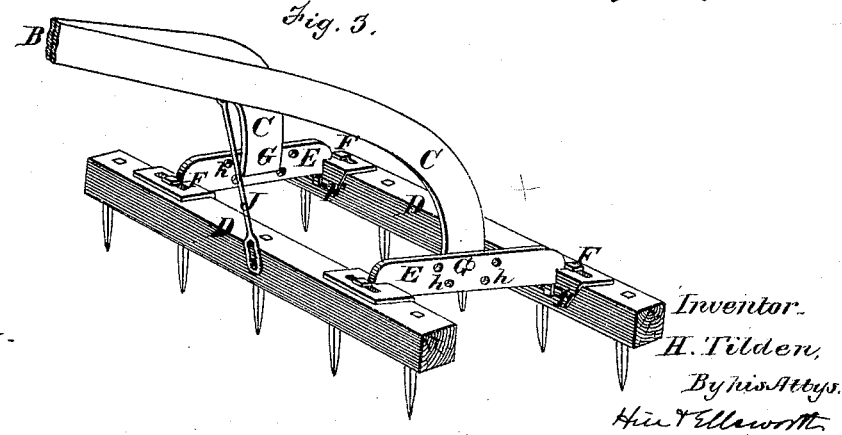

Figure 1 is a side elevation of a cultivator, showing the application of the harrow. Fig. 2 is a top-plan view of the same, and Fig. 3 is a perspective view of a harrow detached from the cultivator.

Similar letters of reference in the accompanying drawing denote the same parts.

My invention has for its object to provide an ordinary straddle-row corn-cultivator with one or more harrows for the purpose of pulverizing the soil between and near the rows of plants; and to this end it consists in the application of the harrows to the standards of the cultivator, the shovels or plows being first removed therefrom for the purpose.

In the accompanying drawing, A represents an ordinary straddle-row cultivator, the beams B of which are provided with shovel or plow standards C in the usual manner. The harrows are each preferably composed of two parallel toothed beams, D, secured together at or near their ends by the cross-bars E. Angular plates are formed upon the ends of the cross-bars to fit against the upper and proximate sides of the beams, and are slotted for the passage of screw-bolts F. By this connection the cross-bars are made adjustable a greater or less distance apart, to correspond with the position of the standards C, to which they are attached by screw-bolts G, the shovels being first removed. The cross-bars are further provided with two or more rows of holes, $h$, arranged above one another, to receive the screw-bolts G, so that the position of the harrows with respect to the standards may be adjusted to change the tracks of the teeth. For example, by moving the inner end of the harrow forward and its outer end to the rear upon their respective standards the distance between the tracks will be different from that produced when both standards are secured to the centers of the cross-bars. Inasmuch as the length of the plow-standards varies considerably in cultivators of different forms, it is necessary that some provision be made to adapt the harrows to these differences, so that the teeth shall bear upon the ground uniformly. This is effected by adjusting the bolts G vertically in the holes $h$, as will be readily understood. The harrows are arranged at an angle with the line of draft, as shown in the drawing, which angle may be increased or diminished by adjusting the standards upon the cross-bar, as previously described, to conform to the distance between the rows of plates. By this arrangement the harrows can be adjusted to run in close proximity to the plants whatever the distance between the rows may be. The length of the harrows may be further adjusted by moving one of the beams upon the slotted plates of the cross-bars, which adjustment also changes the tracks of the teeth, so that one shall not follow in the tracks of the other. I are the handles by which the harrows are guided when in operation, and J is an adjustable rod connecting the forward beam of each harrow with the cultivator-beam, for the purpose of preventing the rear teeth from being lifted out of contact with the ground during the process of harrowing. Without some such provision as this the leverage upon the forward teeth would cause the harrow to turn out of operation. The rods J are adjusted in any suitable manner to regulate the position of the rear teeth and cause them to act upon the ground equally with the front teeth.

When the machine is in operation the harrows pass on each side of a row of corn, being guided nearer to or further from the latter by the handles I, and harrow up and pulverize the ground the full width of the spaces between the rows.

My invention is applicable to any of the known forms of straddle-row cultivators, whether made of wood or metal, and supplies a want long felt among agriculturists.

Having thus described my invention, what I claim is—

1. In combination with the plow-standards of straddle-row cultivators, a harrow attachment for each standard, composed of two or more adjustable toothed beams, D, substantially as described, for the purpose specified.

2. The combination of the adjustable rod J with the cultivator and harrow, substantially as described, for the purpose specified.

3. The harrows, consisting of the parallel beams D, two or more, and the adjustable cross-bars E, substantially as described, for the purpose specified.

HENRY TILDEN.

Witnesses:
  E. A. ELLSWORTH,
  MELVILLE CHURCH.